(12) United States Patent
Patterson et al.

(10) Patent No.: US 7,866,459 B2
(45) Date of Patent: Jan. 11, 2011

(54) SANITARY SLIDE GATE INCORPORATING PERMANENT MAGNET APPARATUS AND METHOD

(75) Inventors: Harold E. Patterson, Indiana, PA (US); Nathan Davis, Tigard, OR (US); Scott Kuhnert, Portland, OR (US)

(73) Assignee: PPM Technologies, Inc., Newberg, OR (US)

( * ) Notice: Subject to any disclaimer, the term of this patent is extended or adjusted under 35 U.S.C. 154(b) by 84 days.

(21) Appl. No.: 12/426,041

(22) Filed: Apr. 17, 2009

(65) Prior Publication Data

US 2009/0260954 A1 Oct. 22, 2009

Related U.S. Application Data

(60) Provisional application No. 61/124,660, filed on Apr. 17, 2008.

(51) Int. Cl.
*B65G 19/28* (2006.01)
(52) U.S. Cl. .................... 198/735.4; 198/860.4
(58) Field of Classification Search ............ 198/530, 198/735.1, 735.3, 735.4, 758, 860.3, 860.4
See application file for complete search history.

(56) References Cited

U.S. PATENT DOCUMENTS

| | | | |
|---|---|---|---|
| 4,136,769 A * | 1/1979 | Dostal, Jr. ............. | 198/860.4 |
| 4,356,911 A | 11/1982 | Brown | |
| 4,573,567 A * | 3/1986 | Swinderman ............ | 198/860.4 |
| 4,705,160 A * | 11/1987 | Grundken et al. ........ | 198/735.4 |
| 4,921,090 A | 5/1990 | Gregor | |
| 4,944,381 A | 7/1990 | Riley | |
| 5,351,807 A | 10/1994 | Svejkovsky | |
| 5,409,101 A | 4/1995 | Ahmed | |
| 5,794,757 A | 8/1998 | Svejkovsky | |
| 5,850,906 A | 12/1998 | Dean | |
| 5,868,241 A | 2/1999 | Pellegrino | |
| 5,938,001 A | 8/1999 | Turcheck, Jr. | |
| 5,981,892 A | 11/1999 | Baird | |
| 6,357,579 B1 | 3/2002 | Patterson | |
| 6,415,911 B1 | 7/2002 | Svejkovksy | |
| 6,505,727 B2 * | 1/2003 | Schroeder et al. ........ | 198/735.4 |
| 6,619,470 B2 | 9/2003 | Thompson | |
| 6,691,853 B1 * | 2/2004 | Basketfield ............ | 198/860.4 |
| 6,896,121 B2 * | 5/2005 | Vorsteher et al. ........ | 198/735.4 |
| 7,735,632 B1 * | 6/2010 | Garlow et al. .......... | 198/860.3 |

\* cited by examiner

*Primary Examiner*—James R Bidwell
(74) *Attorney, Agent, or Firm*—Christensen O'Connor Johnson Kindness PLLC

(57) ABSTRACT

The present disclosure provides a slide gate 201 for use in conveyor systems that include permanent magnets 221 to hold slide gate components in place relative to a conveyor trough 202, while allowing the slide gate 201 to slide between open and closed positions relative to an opening or cutout 219 formed in the conveyor floor. The slide gate 201 is controllably opened and closed by an actuator system and can be magnetically attached to the actuator system 215 such that the slide gate 201 is attached to the conveyor system entirely through magnetic force. Magnetic attachment of the slide gate 201 provides improved performance, ease of cleaning, and safety compared to known slide gate systems.

20 Claims, 8 Drawing Sheets

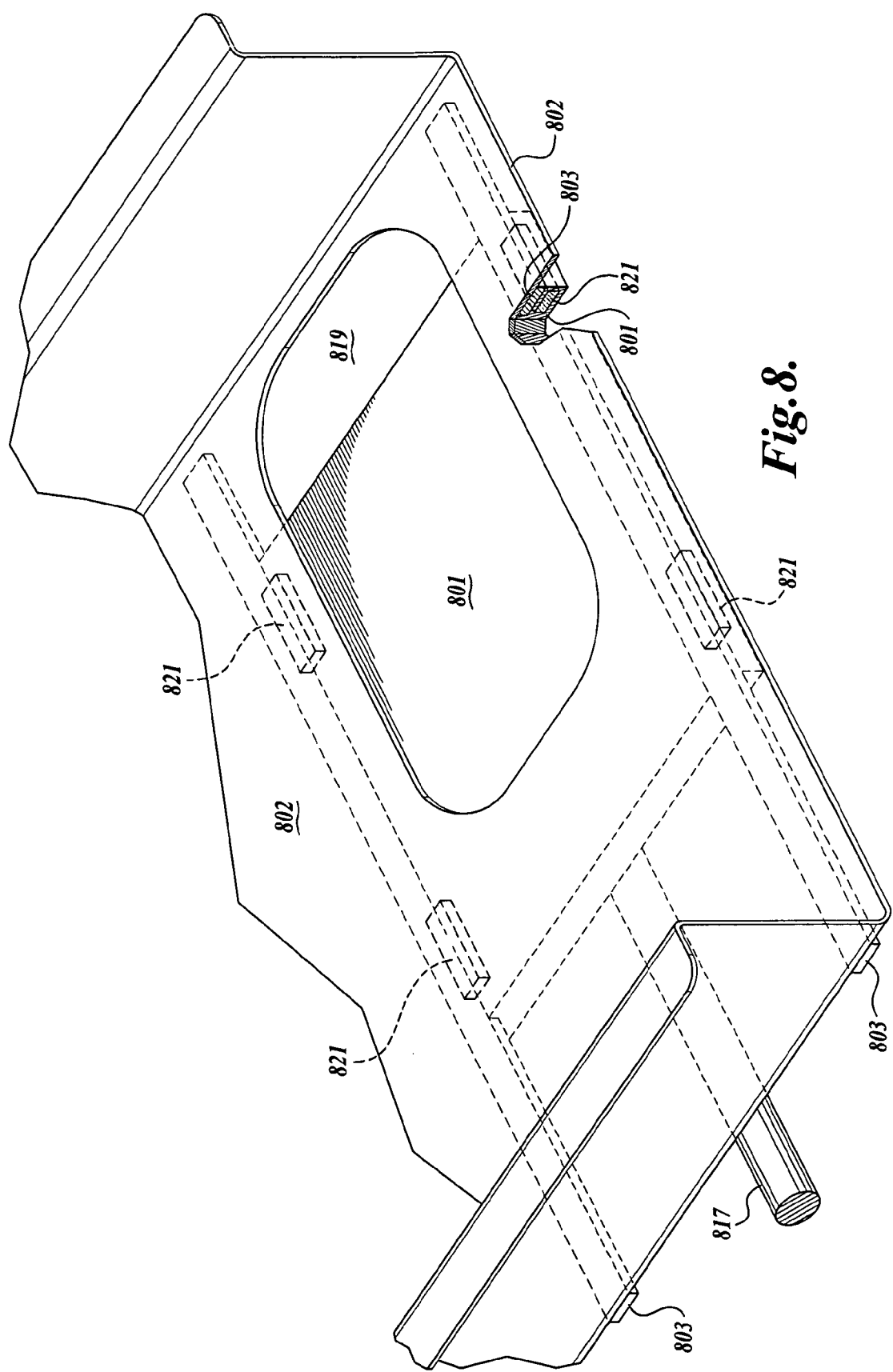

SANITARY SLIDE GATE INCORPORATING PERMANENT MAGNET APPARATUS AND METHOD

CROSS-REFERENCE TO RELATED APPLICATION

This application claims the benefit of U.S. Provisional Application No. 61/124,660, filed Apr. 17, 2008, expressly incorporated herein by reference in its entirety.

TECHNICAL FIELD

The present disclosure relates generally to conveyor systems and, in particular, to a simplified, reliable slide gate design for use with an operating vibratory conveyor, horizontal motion conveyor, or other similar conveyor system.

BACKGROUND

Large conveying systems are employed to transfer and distribute both raw ingredients to, and finished product from, the processing or cooking equipment in the food processing industry and, in particular, industry segments such as snack foods (e.g., potato chips, popcorn, nachos, corn chips, cheese curls, etc.). These systems are often comprised of vibratory or other conveyors, which are used to carry the product from the cookers directly to packaging machines or to distribute the product to other conveyors for transfer to other processes.

Slide gates spaced at appropriate longitudinal distances along the bottom surface or at the discharge end of the conveyor troughs are often employed to facilitate the distribution and transfer function. As the material travels along the conveyor the gates open and close, discharging material to other equipment or storage bins as required. The gates are usually operated by means of air cylinders or the like, causing a retaining plate under a cutout in the conveyor bottom to slide open when activated, thereby allowing material to discharge downwardly from the conveyor as it is fed along.

To a large extent, slide gate designs are driven by the requirement of withstanding the rigors of mounting directly to vibratory or other conveying equipment, which contribute to the variety and complexity of their designs. While present slide designs are functional, they are plagued with problems of sanitation, inherent in the complexity of the mechanisms used. Such complexity also creates difficulties in removing gates for replacement, repair, or cleaning, a time-consuming and cumbersome task. Hand tools and power tools are required to remove fasteners and components, often located in positions where they can fall into the product or otherwise become lost. Mounting rails and clamping mechanisms often have to be removed, usually a difficult task because of limited access to the conveying equipment in the installation. Reinstallation is also difficult, not only because of the limited access, but also because precise adjustments are required in order for the slide mechanisms to function properly. All of these problems also create considerable cost issues, those of the manufacturer, which result in higher costs to the user and those of the user for maintenance and cleaning.

Easier to clean and more sanitary gate designs have evolved over the years to address these problems and while present gate designs have improved the technology of slide gate design, the problems of cost and part complexity have not been entirely resolved. A manufacturer offering solutions that address these continuing concerns will have a competitive advantage because the need for discharge gates in conveying distribution systems is a significant element of these installations.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, a moveable gate for controllably uncovering a cutout in the floor of an elongated conveyor trough of a conveyor system is provided. In one embodiment, the moveable gate, includes: a gate slide plate sized and configured to underlie a bottom surface of an elongated conveyor trough comprising a conveyor floor, a cutout in the conveyor floor, and two sidewalls, the sidewalls defining magnetic mounting rails extending on the conveyor trough along the cutout; wherein the gate slide plate has a length and width sufficient to sealably cover the cutout when underlying the bottom surface of the conveyor trough in a first closed position such that material traveling on the conveyor trough is impeded from passing through the cutout by the gate slide plate; wherein the gate slide plate is slidably movable to a second open position in which the cutout is at least partially not covered by the gate slide plate side such that material traveling on the conveyor trough is not impeded from passing through the cutout by the gate slide plate; wherein the gate slide plate comprises magnets sized and configured to hold the gate slide plate against the adjacent surface of the conveyor trough through the attraction of the magnets to the magnetic mounting rails; and an actuating system for moving the gate slide plate from the first closed position to the second open position.

In another aspect, a portion of a conveyor system adapted to controllably uncover a cutout in the floor of an elongated conveyor trough with a moveable gate is provided, comprising: an elongated conveyor trough comprising a conveyor floor, a cutout in the conveyor floor, and two sidewalls extending laterally from the conveyor floor, the sidewalls comprising magnetic mounting rails extending on the conveyor trough along the cutout; a gate slide plate sized and configured to underlie a bottom surface of the conveyor trough, wherein the gate slide plate has a length and width sufficient to sealably cover the cutout when underlying the bottom surface of the conveyor trough in a first closed position such that material traveling on the conveyor trough is impeded from passing through the cutout by the gate slide plate, wherein the gate slide plate is slidably movable to a second open position in which at least a portion of the cutout is not covered by the gate slide plate side such that material traveling on the conveyor trough is not impeded from passing through the cutout by the gate slide plate; magnets incorporated into the gate slide plate, said magnets being sized and configured to hold the gate slide plate against the adjacent surface of the conveyor trough through the attraction of the magnets to the magnetic mounting rails while allowing the gate slide plate to slide between the first closed position and the second open position; and an actuating system for moving the gate slide plate from the first position to the second position.

In another aspect, a method for controllably uncovering a cutout in the floor of an elongated conveyor trough with a moveable gate is provided, comprising providing a conveyor system, comprising: an elongated conveyor trough comprising a conveyor floor, a cutout in the conveyor floor, and two sidewalls extending along the conveyor trough in the vicinity of the cutout, the sidewalls comprising magnetic mounting rails extending on the conveyor trough along the cutout, a gate slide plate sized and configured to underlie a bottom surface of the conveyor trough, wherein the gate slide plate has a length and width sufficient to sealably cover the cutout when underlying the bottom surface of the conveyor trough in a first closed position such that material traveling on the conveyor trough is impeded from passing through the cutout by the gate slide plate, wherein the gate slide plate is slidably movable to a second open position in which the cutout is at least partially not covered by the gate slide plate side such that material traveling on the conveyor trough is not impeded from passing through the cutout by the gate slide plate, magnets integrated into the gate slide plate, said magnets being sized and configured to hold the gate slide plate against the adjacent surface of the conveyor trough through the attraction of the magnets to the magnetic mounting rails, and an actuating system capable of moving the gate slide plate from the first closed position to the second open position; and operating the actuating system to move the gate slide plate from the first closed position to the second open position.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein:

FIG. 8 is a perspective top view of a representative embodiment of a latitudinally actuating conveyor slide gate of the present disclosure, with the slide gate attached to a conveyor system and in a partially opened position.

DETAILED DESCRIPTION

Figure 1:
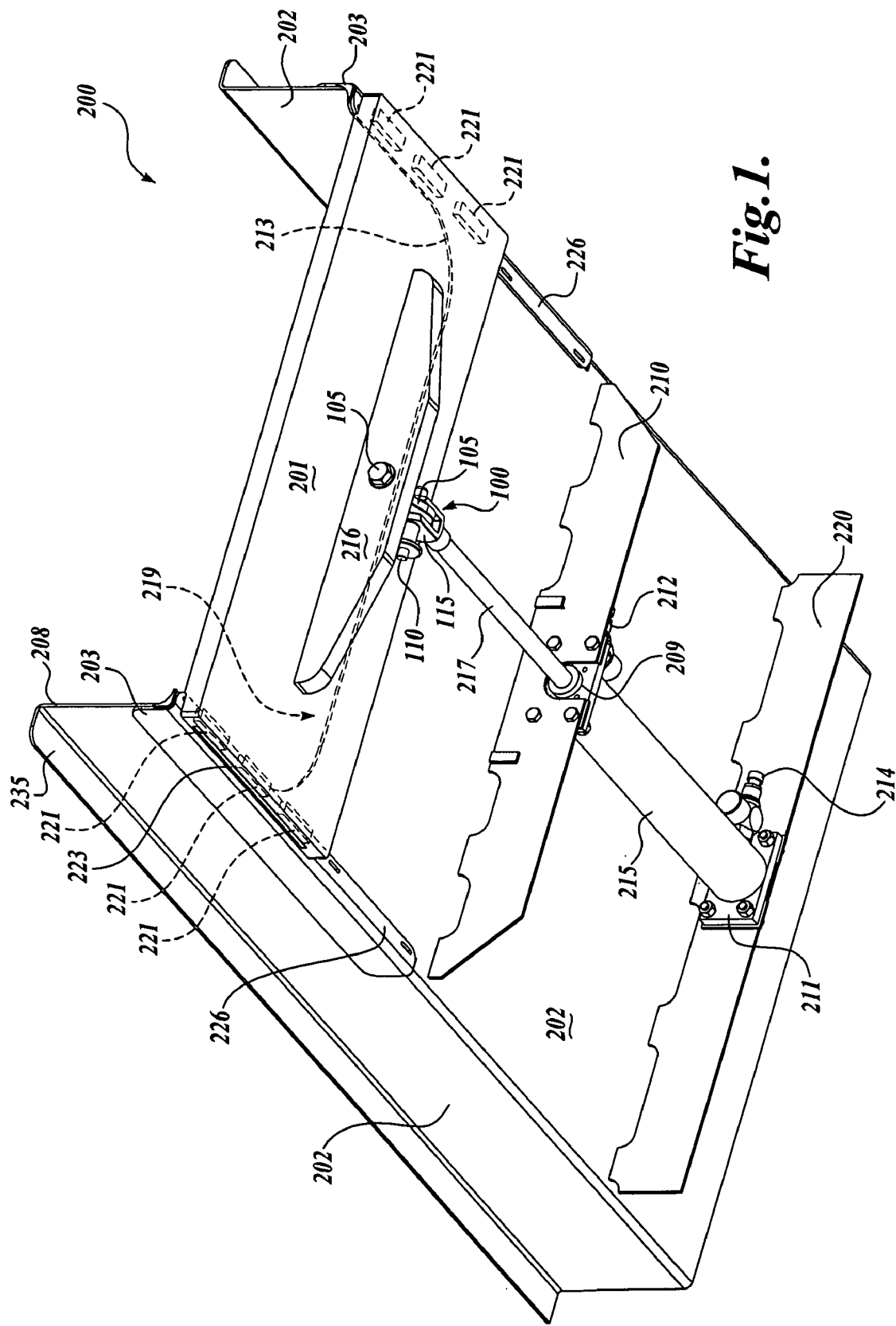
FIG. 1 is a perspective view of a portion of the underside of a representative embodiment of a longitudinally actuating conveyor slide gate of the present disclosure with the slide gate attached to a conveyor system and in a closed position.

The present disclosure provides a slide gate for use in conveyor systems that includes permanent magnets to hold the slide gate components in place. This eliminates the need for tensioning members, or other attachment means of the prior art, considerably reducing the complexity of the slide gate design and thereby reducing manufacturing cost and improving ease of cleaning and operation.

While the drawings and discussion will discuss a disclosed embodiment of the slide gate as used with a vibratory conveyor, it will be appreciated by anyone familiar with the art that the disclosed embodiments can be used with other types of conveyors (e.g., horizontal motion) and many other applications, including stationary equipment within food processing, handling, and distribution systems.

Representative conveyors with which the embodiments disclosed herein may be integrated are known to those of skill in the art. Representative vibratory conveyors are described in U.S. Pat. Nos. 5,409,101, 5,938,001, 5,868,241, 4,944,381, 4,921,090, 4,356,911, 6,357,579, 5,981,892, and 6,619,470, each of which is incorporated herein by reference in its entirety. Representative horizontal motion conveyors are described in U.S. Pat. Nos. 5,850,906, 6,415,911, 5,794,757, and 5,351,807, each of which is incorporated herein by reference in its entirety.

Briefly describing one embodiment of the present disclosure, a polymer gate slide plate 201 has recesses milled in its two outer edges. The recesses are precisely placed to be within a short distance from the upper surface of the gate slide plate 201. One or more rare earth permanent magnets 221 (e.g., neodymium) of specified pull strength is sealed in each recess.

Magnetic guide rails 203 are attached to the side of a conveyor trough 202 such that a bottom flange 226 of the rail 203 is flush with the bottom of the trough 202. The gate slide plate 201 is placed in position under the trough 202 such that it is held in place by the magnets 221, which are magnetically attracted to the guide rails 203. The gate slide plate 201 is sized to cover a cutout 219 in the floor of the conveyor trough 202 that is covered and revealed as the gate operates. The gate slide plate 201 is held adjacent to the conveyor trough 202 entirely through magnetic attraction, and thus is not supported from below by any structure (e.g., underlying rails).

A pneumatic air cylinder 215 activates the gate slide plate 201. The end of a piston rod 217 of the air cylinder 215 (or other type of linear actuator) is fastened to a transverse drive rib 216 mounted on the bottom of the gate slide plate 201. The drive rib 216 may be attached by traditional fasteners (e.g., clevis assembly 100). The air cylinder 215 is thereby connected to the drive rib 216 to operate the gate 201 back and forth with the piston rod 217. Flow control valves 212 and 214 on the air cylinder 215 provide cycle time adjustment and are set such that the gate slide plate 201 moves faster than the product flow, thereby eliminating breakage to the conveyed product.

The permanent magnets 221 holding the gate slide plate 201 in place are sized to withstand the operating accelerations of the conveyor such that the gate slide plate 201 remains tight and flush to the conveyor trough 202 during operation.

FIG. 1 is a sketch looking up from the underside of a vibratory conveyor section that incorporates a slide gate design of one embodiment of the present disclosure. Shown is the discharge portion 200 of a conveyor trough member 202, formed from sheet metal and having bottom pan and two vertical sidewalls 208. The tops of the sidewalls 208 are bent outwardly at 90° to form a short transverse sidewall stiffening section 235. A cutout 219 (shown in phantom) is formed in the pan at the discharge end of the conveyor trough 202. The cutout 219 defines a transverse edge 213.

Two magnetic angle-shaped mounting rails 203, preferably constructed from stainless steel, such as 17-4 PH or 430 stainless steel, are attached externally, one on each side of the conveyor trough vertical sidewalls 208. The rails 203 have horizontal flange portions 226 that overlap the corresponding portions of the trough 202 to serve as magnetic surfaces along which the slide plate 201 slides. A flat, rectangular gate slide plate 201, being slightly wider than the trough 202, is positioned beneath the conveyor trough 202 such that its longitudinal edges fit flush to a bottom flanges 226 of the mounting rails 203.

Permanent magnets 221 (shown in phantom) that are sealed in recesses (not illustrated) milled into the side edges of the gate slide plate 201 hold it in place. A plug 223 that is plastic-welded into the mouth of the recess containing the magnets 221 completes the seal.

A drive rib 216 depends down from, and extends laterally along, the bottom of the gate slide plate 201 and functions to provide a point of attachment between the gate slide plate 201 and a pneumatic cylinder 215. The drive rib 216 additionally functions as a stiffening member that urges the gate slide plate 201 into flush contact with the horizontal flange portions 226 of the mounting rails 203. The drive rib 216 is formed from a material similar to the gate slide plate 201 (e.g., polymer), and is attached (e.g., thermally welded) to the bottom of the gate slide plate 201.

The pneumatic cylinder 215, or other type of linear actuator, is mounted by means of brackets 209 and 211 between two transverse ribs 210 and 220, welded or otherwise attached to the underside of the trough 202 bottom, upstream from the gate slide plate 201. Bolts or other hardware members fasten the brackets to the ribs 210 and 220.

The pneumatic cylinder 215 actuates the gate slide plate 201 by applying force to the drive rib 216 through a mechanical connection, such as a clevis assembly 100. The pneumatic cylinder 215 includes a cylinder rod 217, the distal end of which is connected to the drive rib 216 by the clevis assembly 100. The clevis assembly 100 includes a clevis 115, on the distal end of the cylinder rod 217, an eye bolt 105 (immobilized in the drive rib 216), and a ball lock pin 110 fastening the eye bolt 105 to the clevis 216.

Air hose connections 212 and 214 connect the pneumatic cylinder 215 to a source of pressurized air (not shown).

Figure 2:
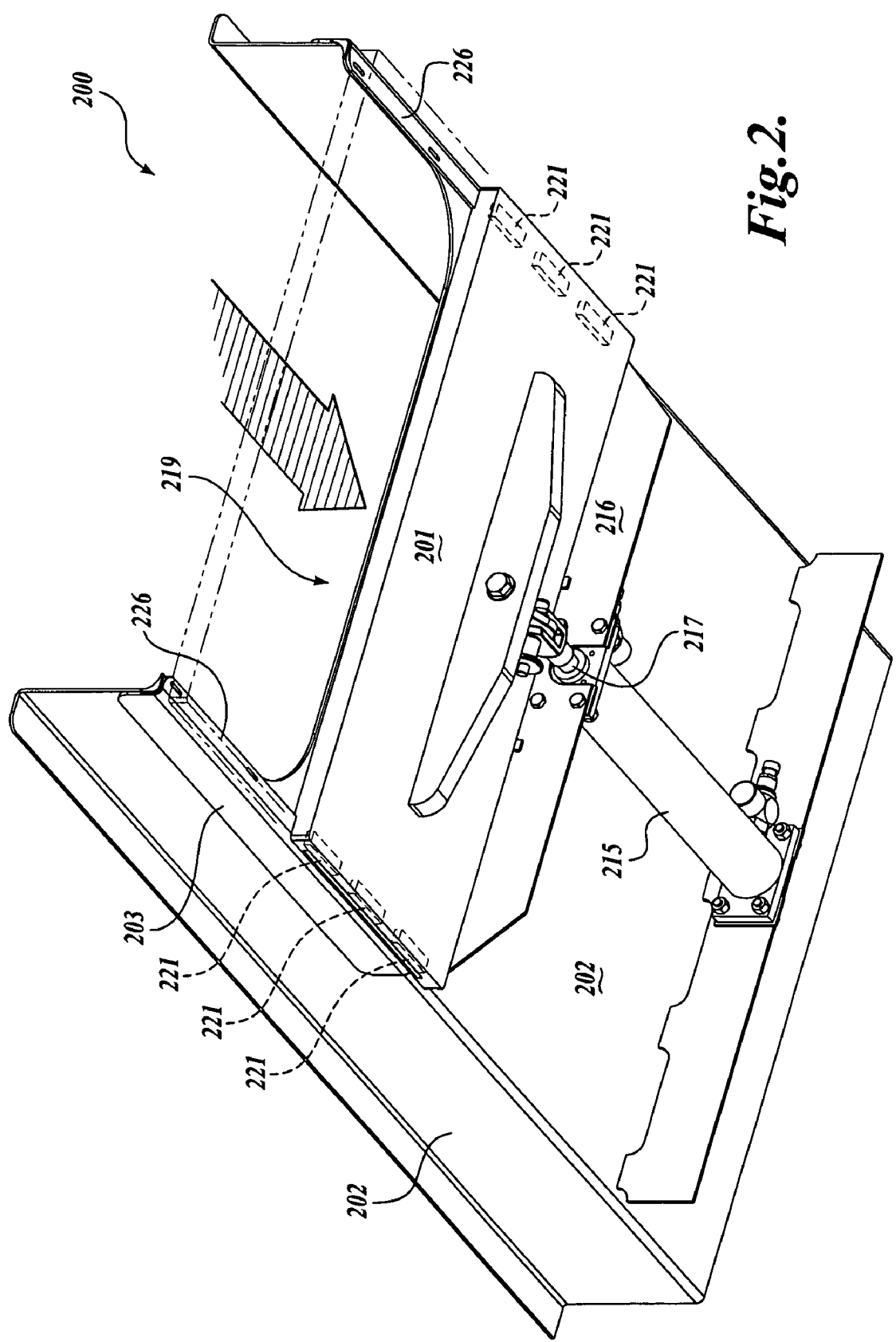
FIG. 2 is a perspective illustration of the embodiment illustrated in FIG. 1 having the slide gate moved to an open position to reveal a cutout in the trough of the conveyor system.

Whereas the gate slide plate 201 attached to the conveyor 200 illustrated in FIG. 1 is in a closed position (because the cutout 219 is covered by the gate slide plate 201), FIG. 2 illustrates the conveyor 200 of FIG. 1 with the gate slide plate 201 in an open position with the cutout 219 revealed from the bottom such that material passing along the conveyor trough 202 would pass through the cutout 219 (e.g., for transfer to packaging or further processing). The gate slide plate 201 is moved into the open position by the pneumatic cylinder 215 retracting the cylinder rod 217 such that the gate slide plate 201 is urged from the closed to the open position.

In the embodiments described herein, the gate slide plate 201 is in a "closed" position if no portion of the cutout 210 is revealed; and in an "open" position when at least a portion of the cutout 210 is revealed by the movement of the gate slide plate 201. The gate slide plate 201 can be moved from a closed position to a fully open position, where the cutout 210 is entirely revealed. Opening the gate slide plate 201 to intermediate positions (e.g., only a portion of the cutout 219 is revealed) is also contemplated.

The gate slide plate 201 is aided in moving to the open position illustrated in FIG. 2 by the low friction movement of the gate slide plate 201, fabricated in a representative embodiment from a polymer such as HDPE (high-density polyethylene), which has a low coefficient of friction when in contact with mounting rails 203. Representative dimensions for the gate slide plate 201 include a thickness of from ¾" to 1"; a length of from 8" to 18"; and a width of from 6" to 36". A stiffening rib 640 (illustrated in FIG. 6) is optionally added for gates about 18" or wider.

Figure 3:
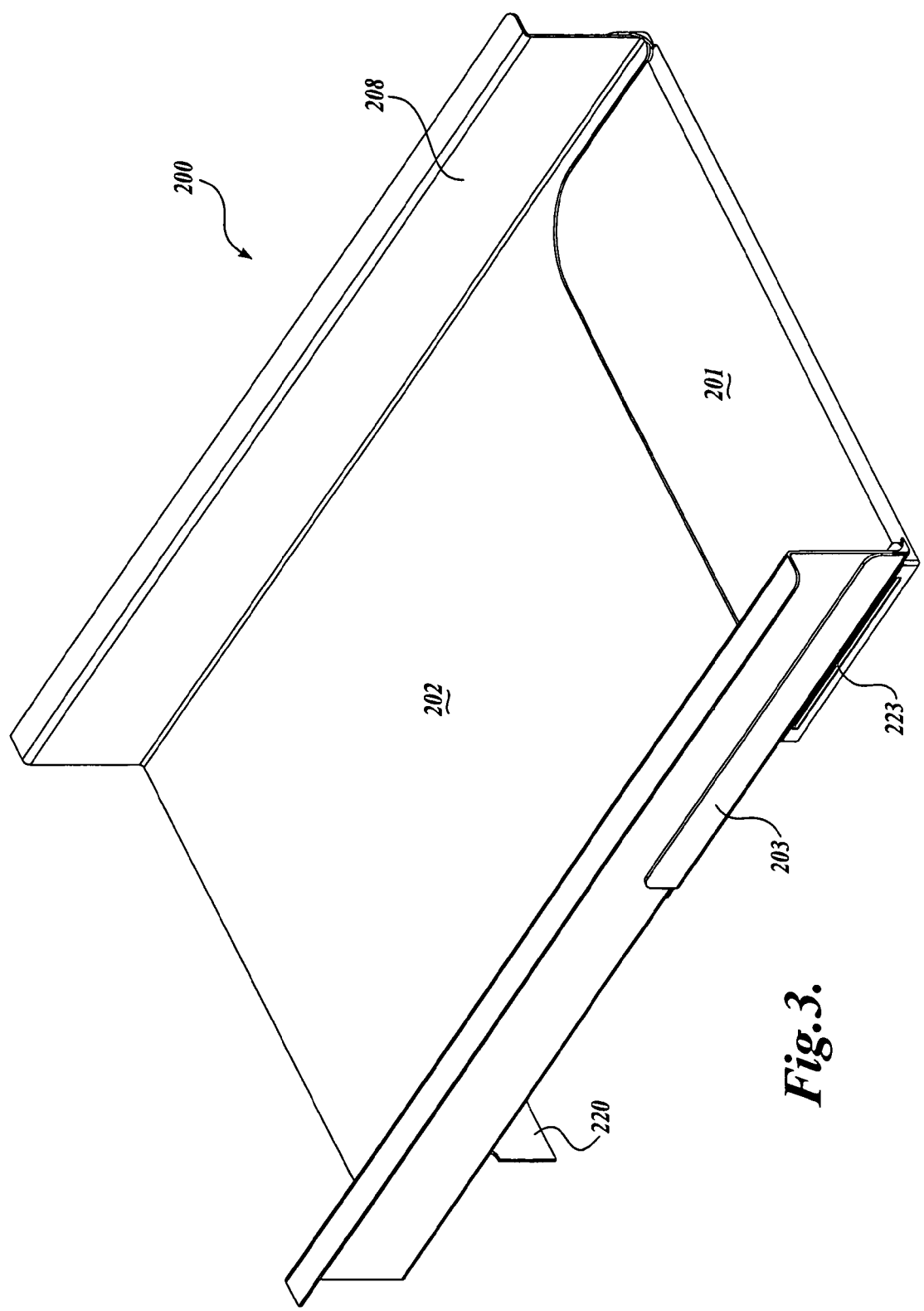
FIG. 3 is a perspective top view of the conveyor system illustrated in FIG. 1.
Figure 4:
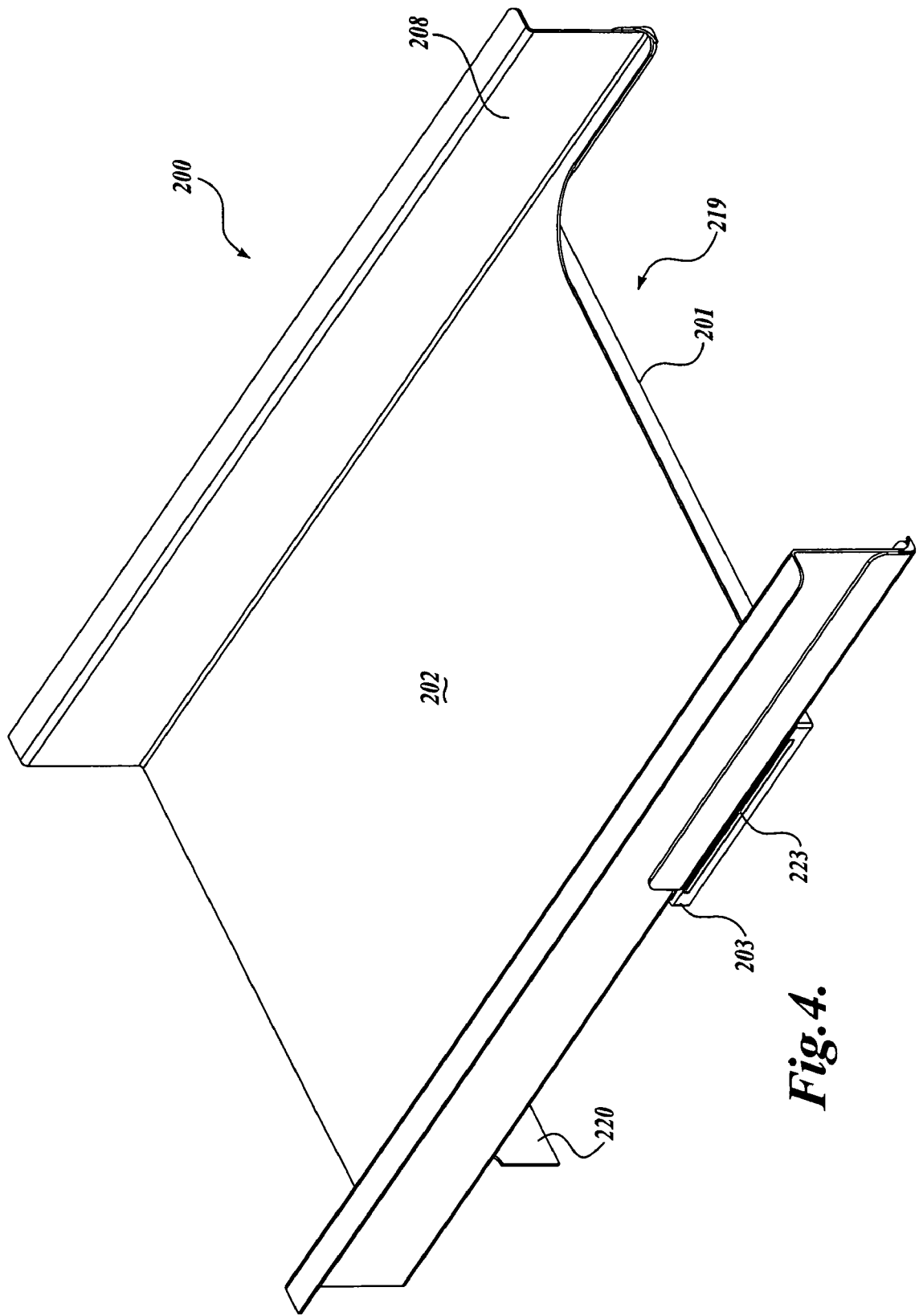
FIG. 4 is a perspective top view of the conveyor system illustrated in FIG. 2.

FIGS. 3 and 4 illustrate the conveyor trough 202 from an above perspective view. FIG. 3 illustrates the gate slide plate 201 in a closed position and FIG. 4 illustrates the gate slide plate 201 in an open position revealing the cutout 219.

Figure 5:
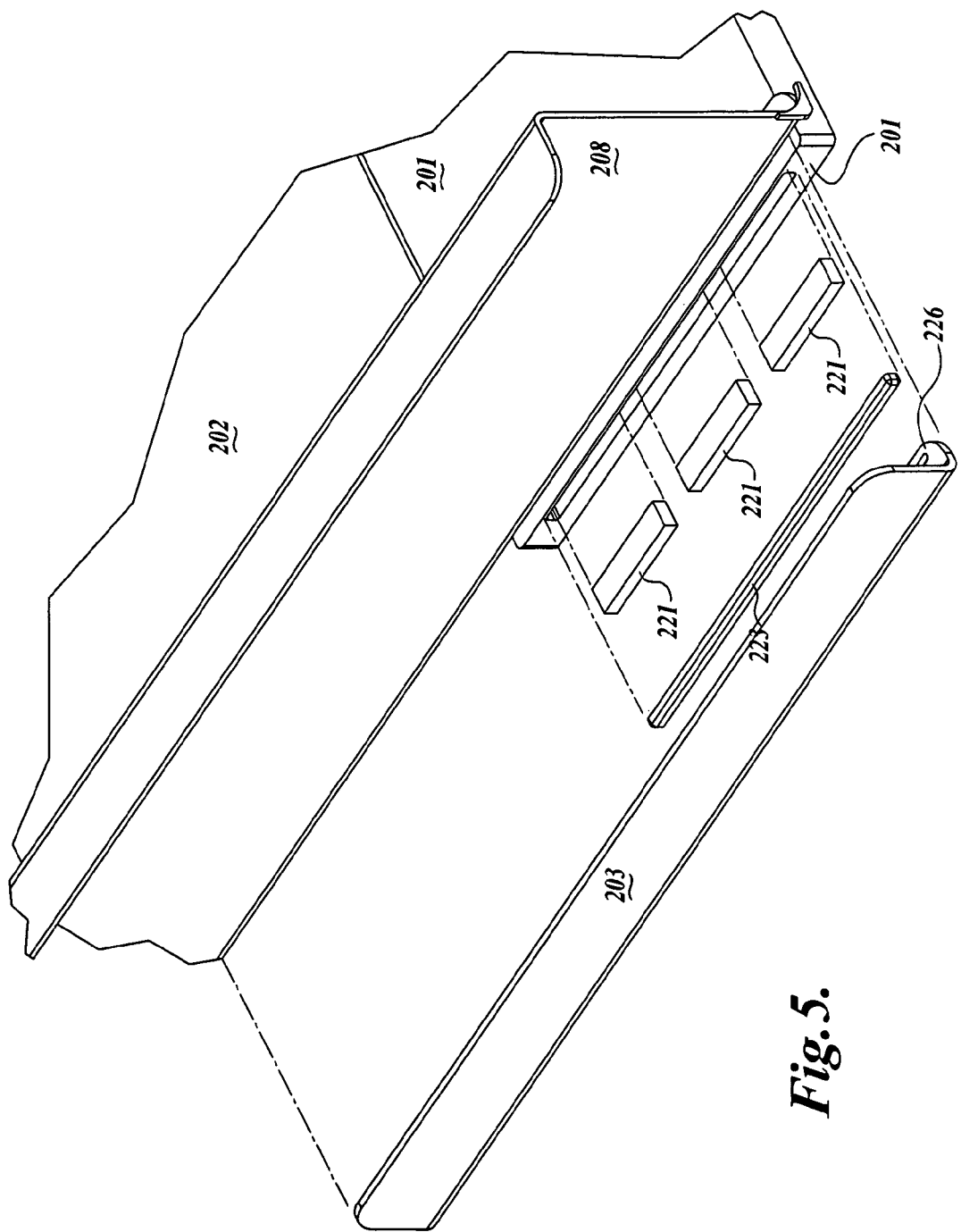
FIG. 5 is an exploded view of a detailed section of conveyor slide gate attached to a conveyor trough in a representative embodiment of the present disclosure.

FIG. 5 is a partial exploded view of the conveyor 200 illustrated in FIGS. 1-4 and illustrates a detailed section of a gate slide plate 201 attached to a conveyor trough 202 in a representative embodiment of the present disclosure. Magnets 221 are embedded in the gate slide plate 201 and sealed in by a plug 223. Mounting rails 203 attach to the sidewalls 208 of the conveyor trough 202 and facilitate sliding movement of the gate slide plate 201 along the bottom flange 226 of the mounting rails 203. Mounting rails 203 may also be integrated into the construction of the conveyor trough 202 itself. Additionally, optional guides (e.g., a guide flange, not illustrated) may be incorporated into the mounting rails 203 or conveyor trough 202 such that lateral motion of the gate slide plate 201, when moving between the first and second positions, is minimized.

Figure 6:
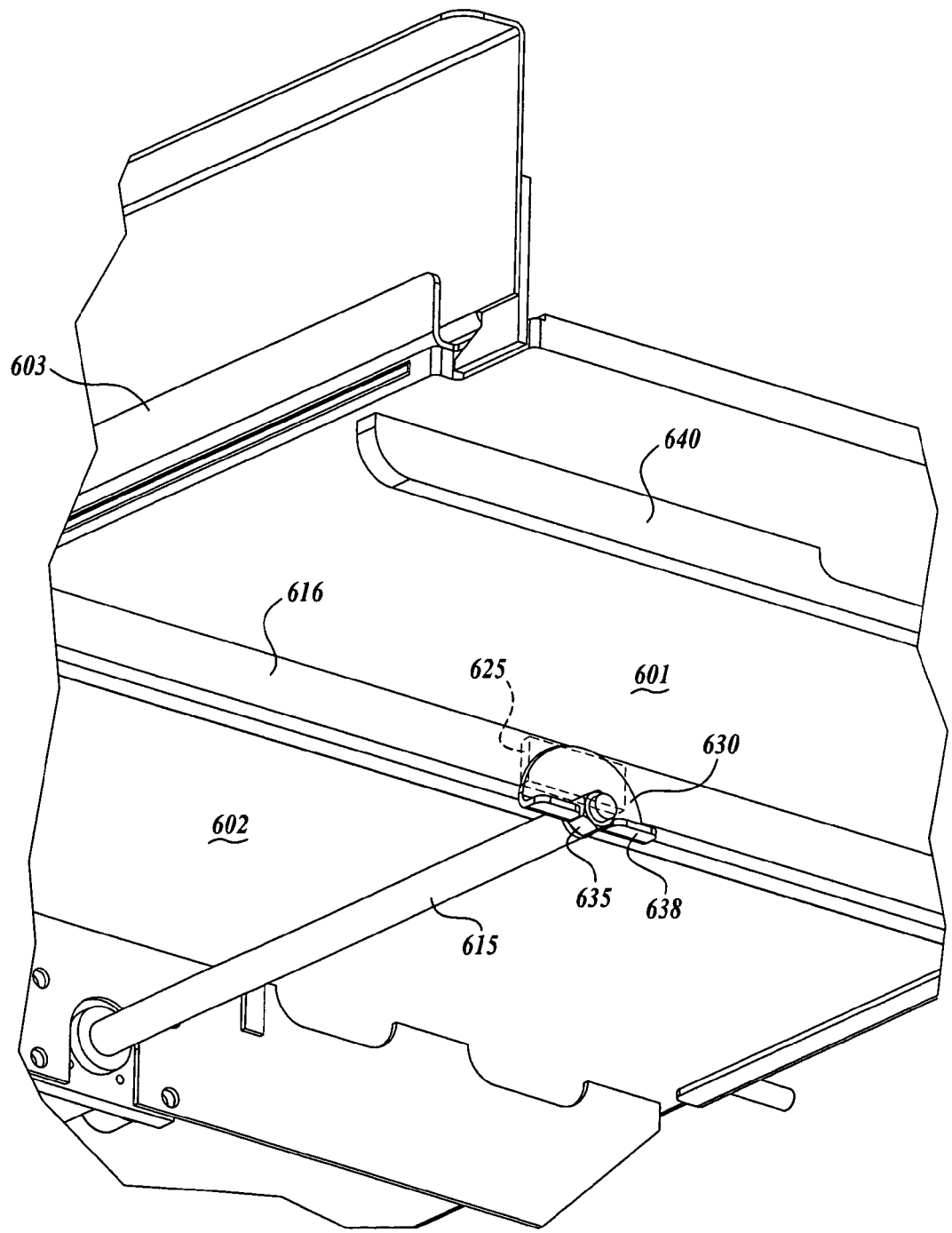
FIG. 6 illustrates a magnetic attachment for joining an actuator system to a slide gate by magnetic force in accordance with the present disclosure.
Figure 7:
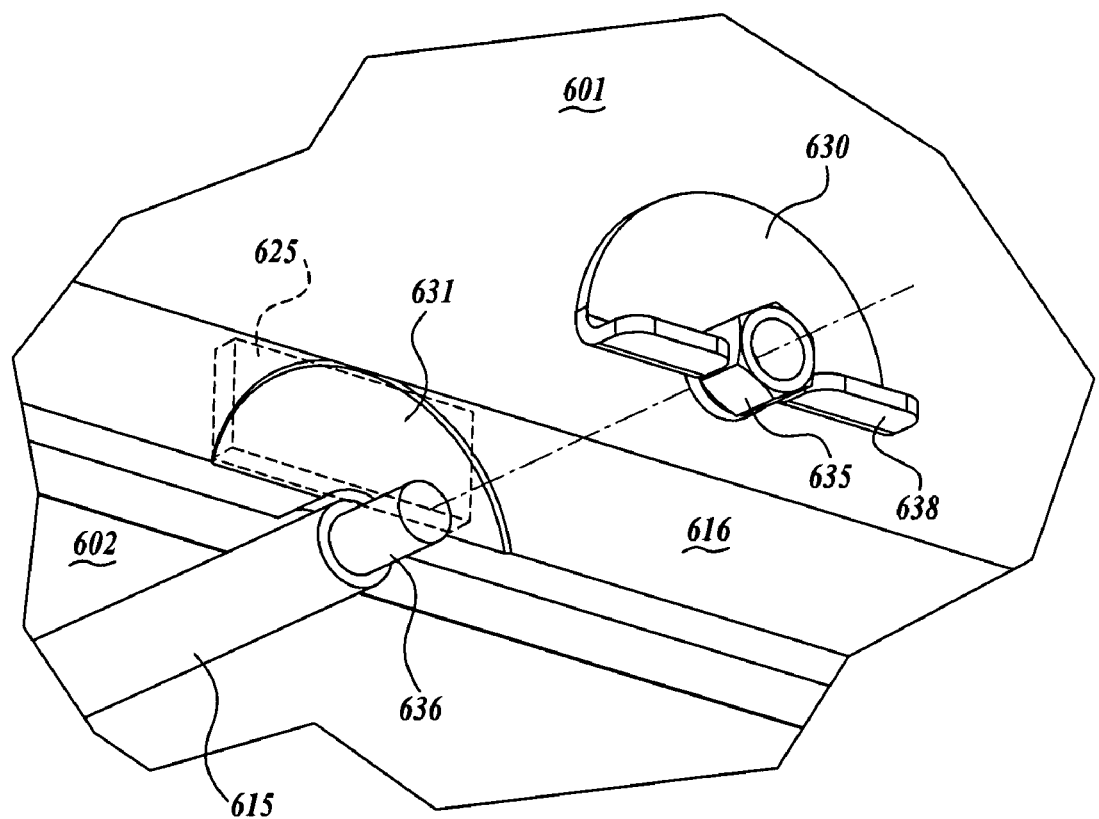
FIG. 7 is an exploded view of the magnetic attachment illustrated in FIG. 6 for joining an actuator system to a slide gate.

So as to facilitate simplified detachment of the gate slide plate from the conveyor trough, in another embodiment of the present disclosure, a magnetic attachment is used to attach the actuator to the gate, as illustrated in FIGS. 6 and 7, with FIG. 6 showing the underside of a gate slide plate 601, and an exploded view of a portion of FIG. 6 illustrated in FIG. 7. A transverse drive rib 616 depends down from the underside of the gate slide plate 601. A lateral stiffening rib 640 of similar dimensions as the drive rib 616 is also included to facilitate flush contact between the gate slide plate 601 and mounting rails 603. One or more permanent magnets 625 (illustrated in phantom) are embedded in the drive rib 616. A generally semicircular magnetic drive plate 630 is received within a similarly shaped shallow recess 631 (shown in FIG. 7) in the drive rib 616 for purposes of alignment. The magnet 625 within the drive rib 616 holds the drive plate 630 in place within the recess 227, against the face of the drive rib 616. A locknut 635 is attached to the drive plate 630 to engage the threaded distal end 636 (illustrated in FIG. 7) of a piston rod 615 that is a portion of an actuator (not pictured). The piston rod 615 thereby connects to the drive rib 216 through the attraction of the magnet 625 to the drive plate 630. The drive plate 630 includes a lower transverse flange 638 to enhance the structural integrity of the drive plate 630. The drive plate 630 can be of other shapes and construction and shall function in the intended manner. The gate slide plate 601 is slidably opened and closed by the operation of the actuator, similar to the above-described embodiment with reference to FIGS. 1-5.

The gate slide plate (e.g., 201), plug (e.g., 223), drive rib (e.g., 216), and stiffening rib 640, may be composed of HDPE, polypropylene, or other similar hydrocarbon material of sufficient strength and structural integrity.

The shear force withstood by the permanent magnet 221 is only about one third of the attracting force holding the gate slide plate 201 in place against the slide rails 203. The low coefficient of friction between the gate slide gate 201 (e.g., HDPE) and mounting rails 203 (e.g., stainless steel) allows the gate slide plate 201 to be slidably detached from the trough for simplified cleaning or maintenance.

The slide gate is subjected to fairly high acceleration levels during operation of the vibratory conveyor. Equation 1 gives the acceleration along the driveline for a harmonic motion, vibratory conveying device.

$$K = \frac{4\pi^2 \cdot N^2 \cdot A_T}{2 \cdot g} \qquad \text{Equation 1}$$

Where K=Acceleration.

N=Operating frequency in Hz (cps).

$A_T$=Trough stroke in inches.

g=386=Acceleration due to gravity in inches/sec².

The vertical component of this acceleration acting against the slide gate is given by Equation 2.

$$K_v = K \cdot \sin(\theta) \quad \text{Equation 2}$$

Where $K_v$=Vertical component of acceleration.

θ=Drive angle in degrees

For an example, applying the above equations to a typical conveyor having an operating frequency of 20 Hz (1200 cpm), a trough stroke of 0.25 inch, a drive angle of 20°, and a gate slide plate 201 weight of 10 lbs. would result in a vertical acceleration component of 1.75 G. Since force equals mass times acceleration, as shown in Equation 3, the force required to hold the gate plate to the guide rails would have be greater than 17.5 lbs.

$$F_v = m \times K_v = 10.0 \times 1.75 = 17.5 \text{ Lbs.} \quad \text{Equation 3}$$

Where $F_V$=Vertical force component in Lbs.

m=Mass

In a practical design, to account for any unforeseen circumstance, such as surface roughness, off-tolerance manufacturing, assembly misalignment, or the like, an engineering safety factor is applied. In a disclosed embodiment of the invention, a safety factor of from five to ten is applied to the calculated force as shown in Equation 4, resulting in a required retaining force of 87.5 lbs. for this example (using a safety factor of five).

$$F_T = F_V \times f_s = 17.5 \times 5 = 87.5 \text{ Lbs.} \quad \text{Equation 4}$$

Where $F_T$=Total design force $f_s$=Safety factor

In the past, the commercially available ferrous and ceramic permanent magnets were not capable of providing such force requirements in sizes needed to meet the physical limitations of a practical gate design. Also the characteristics of such typical magnets was such that their strength weakened with time and temperature or did not recover their strength when inadvertently subjected to external magnetic fields or to mechanical shock. For these reasons, magnets were not seriously considered in the designs of vibratory conveyors or feeders.

To the best knowledge of the inventors, they are the first to use permanent magnets in the design of a slide gate, integral to an operating vibratory conveyor or other type of conveyor. The strength per given physical size of permanent magnets incorporating the rare earth magnetic material neodymium is large enough to secure the gate of the present disclosure. Representative permanent magnets are made from an alloy of neodymium, iron, and boron (NdFeB) and are commercially available.

In one embodiment of the present disclosure, the permanent magnet chosen for the design is a rectangular block magnet that is 2" long by ½" wide by ¼" thick and it has a rated comparative pull force of 84 lbs. The pull force of the magnets is determined by using both pole faces of the magnet, essentially doubling the force. The actual pull force realized from the magnet will be much less, because one must take into consideration the number and reluctance of all of the magnetic flux paths involved and that only one pole face is being utilized has been measured.

The actual pull force of the magnet has been measured in a jig, whereby one end of the magnet was epoxy glued to a fixture made from non-magnetic material and the other end was held by its magnetic attraction to a block of mild steel, having a hook welded to its opposite surface. A "spring scale" attached to the hook, was then used to measure the force at the point where the block separated from the magnet as vertical pressure was applied to the "spring scale." Spacers made of non-magnetic material of known thickness were inserted, one at a time, between the magnet face and the steel block to establish exact distances from the magnet to the surface of the steel block. The test was repeated for each spacer and the results recorded. The pull force ratings of the magnet at the various distances from the top surface of the magnet are given in Table 1. The attractive forces are shown to vary from a pull force of 27 lbs. at zero distance (no spacer), 19 lbs. at a 1/16" distance, and 1 lb. at a distance of 7/16".

In food handling applications, in particular, it is especially important that no foreign objects, such as parts of the conveying apparatus, be allowed to enter the food process stream. For this reason, in a disclosed embodiment, the magnet components 221 are embedded in the edges of the gate slide plate 201. In an exemplary embodiment, the depth from the top surface of the gate slide plate 201 to the top of the magnets 221 was chosen to be approximately 1/16", being a good compromise between the structural requirements (strength, stiffness, and wear), and the attracting force of the magnets 221 at the 1/16" distance from the bottom flange 226 of the mounting rails 203. Of course, the magnets can be located at other depths within the gate slide plate.

From Table 1, at a distance of 1/16" from the magnet 221, the measured pull force is approximately 19 lbs. From the above calculations, it was shown that a force of 87.5 lbs. was needed to safely hold the gate components in place during operation of the conveyor. Dividing the force requirement by the pull force of one magnet should then give the number of magnets needed to hold the gate slide plate 201 in place. Dividing 87.5 by 19 yields 4.6; therefore, at least five magnets 221 are required to meet the design criteria. For the sake of symmetry, six magnets, three on each side of the gate slide plate 201, were selected for the disclosed embodiment illustrated in FIGS. 1-5. The foregoing is summarized by Equation 5.

$$m_n = \frac{F_r}{F_m} \quad \text{Equation 5}$$

Where $m_n$=Minimum number of magnets required.

$F_r$=Required holding force (Lbs.)

$F_m$=Pull force of a single magnet (Lbs).

TABLE 1

BY084 Permanent Magnet
Pull Force vs. Distance From Magnet
(Distance in inches-Force in Pounds)

| Distance | Force |
|---|---|
| 0 | 27.08 |
| 1/16 | 18.82 |
| 1/8 | 12.15 |
| 3/16 | 4.84 |
| 1/4 | 3.13 |
| 5/16 | 2.08 |
| 3/8 | 1.42 |
| 7/16 | 0.99 |

The holding force of the permanent magnets 221 in the shear direction is only about one third of the attracting force holding the gate slide plate 201 in place against the guide rails 203. This fact, along with a low kinetic coefficient of friction between gate slide plate 201 and guide rails 203 make it relatively easy to move the gate slide plate 201 back and forth on the stainless guide rails 203 while the gate slide plate 201 remains held tightly in place against the underside of guide rails 203 and the bottom of the conveyor trough 202. In the exemplary embodiment described above, using a kinetic coefficient of friction of 0.22, a maximum force of about 46 lbs. is all that the pneumatic cylinder 215 would be required to supply to move the gate slide plate 201 back and forth on the mounting rails 203.

A further optional feature of the present disclosure is to provide a slide gate design that is quickly and easily removed from the conveyor for cleaning or repair, is of sanitary construction, and is safe to operate. Because the permanent magnet 221 holding force in the shear direction is relatively low, it is easy to remove the gate slide plate 201 free of the trough for cleaning or for maintenance by first disengaging the drive rib 216 from the drive piston arm 217 and then sliding the gate slide plate 201 away from the mounting rails 203.

In the embodiment where the piston arm 615 is magnetically attached to the drive rib 616, the magnetically held drive plate 630 may be disengaged from the drive rib 616 by first using the pneumatic drive cylinder 215 to retract the gate slide plate 601 to the open position and closing the gate slide plate 601 on a suitable wooden block (or the like) and thereby use the force generated by the pneumatic cylinder 615 to disengage the drive plate 630 from the drive rib 616. This is also an optional safety feature because, should the slide gate 601 become accidentally jammed, or an operator inadvertently places a hand or arm in the gate opening as the gate is closing, the magnetically held drive plate 630 will break free of the drive rib 616, preventing serious harm to the operator and to the equipment.

The above-described embodiments relate to a longitudinally actuated gate slide plate 201. The use of magnets embedded in a gate slide plate can be applied to alternative embodiments that include differently-shaped gate-cutout combinations (e.g., pie-shaped) and/or different directions for sliding the gate slide plate (e.g., latitudinal or arcuate movement).

In one embodiment, illustrated in FIG. 8, the gate slide plate 801 is latitudinally actuated in relation to a conveyor trough 802 to reveal a cutout 819 that extends partially across the width of the pan of a conveyor trough 802. Magnetic mounting rails 803 are attached to, and extend latitudinally across, the bottom side of the conveyor trough 802. The gate slide plate 801 includes embedded magnets 821 positioned to facilitate magnetic attachment of the gate slide plate 801 to the magnetic mounting rails 803. The mounting rails 803 are situated in a shallow notch formed in the gate slide plate 801 such that the gate slide plate 201 can sealably contact the bottom of the conveyor trough 802. The gate slide plate 801 is actuated by a linear actuator (not pictured) having a piston arm 817 connected to the gate slide plate 801 (e.g., through a clevis assembly attaching the piston arm 817 to a mounting rib depending down from the gate slide plate 801, similar to the embodiments described above).

The operation of the latitudinally actuated gate slide plate 801 is similar to that of the longitudinally gate slide plate described previously (e.g., 201), in that a linear actuator moves the gate slide plate 801 between open and closed positions to reveal or cover a cutout 819 in the pan of the conveyor trough 202.

Further alternative embodiments are contemplated, such as a pie-shaped cutout in a conveyor trough covered from below by a pie-shaped gate slide plate, having an apex and an arcuate portion, attached to the bottom of the conveyor trough at the apex (either mechanically or magnetically). Magnets are embedded in the arcuate portion of the gate slide plate and an arcuate magnetic mounting rail attached to the bottom of the conveyor trough facilitates travel of the gate slide plate between open and closed positions. An actuator attached to the gate slide plate moves the gate slide plate arcuately between open and closed positions.

While illustrative embodiments of the present disclosure have been illustrated and described, it will be appreciated that various changes can be made therein without departing from the spirit and scope of the invention.

The embodiments of the invention in which an exclusive property or privilege is claimed are defined as follows:

1. A moveable gate for controllably uncovering a cutout in the floor of an elongated conveyor trough of a conveyor system, comprising
    (a) a gate slide plate sized and configured to underlie a bottom surface of an elongated conveyor trough comprising a conveyor floor, a cutout in the conveyor floor, and two sidewalls, the sidewalls defining magnetic mounting rails extending on the conveyor trough along the cutout;
    wherein the gate slide plate has a length and width sufficient to sealably cover the cutout when underlying the bottom surface of the conveyor trough in a first closed position such that material traveling on the conveyor trough is impeded from passing through the cutout by the gate slide plate;
    wherein the gate slide plate is slidably movable to a second open position in which the cutout is at least partially not covered by the gate slide plate side such that material traveling on the conveyor trough is not impeded from passing through the cutout by the gate slide plate;
    wherein the gate slide plate comprises magnets sized and configured to hold the gate slide plate against the adjacent surface of the conveyor trough through the attraction of the magnets to the magnetic mounting rails; and
    (b) an actuating system for moving the gate slide plate from the first closed position to the second open position.

2. The moveable gate of claim 1, further comprising a magnetic attachment by which the actuating system is attached to the gate slide plate.

3. The movable gate of claim 2, wherein the magnetic attachment comprises a drive magnet embedded in a drive rib projecting from a bottom side of the gate slide plate and a magnetic drive plate mechanically attached to the actuating system, wherein the drive magnet and the magnetic drive plate are in magnetic communication such that movement of the magnetic drive plate by the actuating system results in a force on the drive magnet such that the gate slide plate is urged to move slidably along the bottom surface of the conveyor trough.

4. The movable gate of claim 1, wherein the gate slide plate is formed from a polymer.

5. The moveable gate of claim 1, wherein the magnets are permanent magnets.

6. The moveable gate of claim 1, wherein the magnets comprise neodymium.

7. The moveable gate of claim 1, wherein the gate is attached to a conveyor system selected from the group consisting of a vibratory conveyor system and a horizontal motion conveyor system.

8. The moveable gate of claim 7, wherein the magnets have a magnetic force sufficient to maintain sealably covering the cutout in the first closed position when the conveyor system is operating.

9. The moveable gate of claim 1, wherein the actuating system comprises a linear actuator having a distal end attached to the gate slide plate.

10. The moveable gate of claim 1, wherein the gate slide plate is attached to both the conveyor trough and the actuating system only through magnetic force.

11. A portion of a conveyor system adapted to controllably uncover a cutout in the floor of an elongated conveyor trough with a moveable gate, comprising
    (a) an elongated conveyor trough comprising a conveyor floor, a cutout in the conveyor floor, and two sidewalls extending laterally from the conveyor floor, the sidewalls comprising magnetic mounting rails extending on the conveyor trough along the cutout;
    (b) a gate slide plate sized and configured to underlie a bottom surface of the conveyor trough, wherein the gate slide plate has a length and width sufficient to sealably cover the cutout when underlying the bottom surface of the conveyor trough in a first closed position such that material traveling on the conveyor trough is impeded from passing through the cutout by the gate slide plate, wherein the gate slide plate is slidably movable to a second open position in which at least a portion of the cutout is not covered by the gate slide plate side such that material traveling on the conveyor trough is not impeded from passing through the cutout by the gate slide plate;
    (c) magnets incorporated into the gate slide plate, said magnets being sized and configured to hold the gate slide plate against the adjacent surface of the conveyor trough through the attraction of the magnets to the magnetic mounting rails while allowing the gate slide plate to slide between the first closed position and the second open position; and
    (d) an actuating system for moving the gate slide plate from the first position to the second position.

12. The portion of a conveyor system of claim 11, wherein the magnetic mounting rails are made independently of the conveyor trough and attached magnets.

13. The portion of a conveyor system of claim 11, wherein the magnetic mounting rails are magnetic and the conveyor trough is not magnetic.

14. The portion of a conveyor system of claim 11, wherein the portion of a conveyor system is integrated into a conveyor system selected from the group consisting of a vibratory conveyor system and a horizontal motion conveyor system.

15. The portion of a conveyor system of claim 11, wherein the actuating system comprises a linear actuator having a distal end attached to the gate slide plate.

16. The portion of a conveyor system of claim 11, wherein the gate slide plate is attached to both the conveyor trough and the actuating system only through magnetic force.

17. A method for controllably uncovering a cutout in the floor of an elongated conveyor trough with a moveable gate, comprising
    (a) providing a conveyor system, comprising
        (i) an elongated conveyor trough comprising a conveyor floor, a cutout in the conveyor floor, and two sidewalls extending along the conveyor trough in the vicinity of the cutout, the sidewalls comprising magnetic mounting rails extending on the conveyor trough along the cutout;
        (ii) a gate slide plate sized and configured to underlie a bottom surface of the conveyor trough, wherein the gate slide plate has a length and width sufficient to sealably cover the cutout when underlying the bottom surface of the conveyor trough in a first closed position such that material traveling on the conveyor trough is impeded from passing through the cutout by the gate slide plate, wherein the gate slide plate is slidably movable to a second open position in which the cutout is at least partially not covered by the gate slide plate side such that material traveling on the conveyor trough is not impeded from passing through the cutout by the gate slide plate;
        (iii) magnets integrated into the gate slide plate, said magnets being sized and configured to hold the gate slide plate against the adjacent surface of the conveyor trough through the attraction of the magnets to the magnetic mounting rails; and
        (iv) an actuating system capable of moving the gate slide plate from the first closed position to the second open position; and
    (b) operating the actuating system to move the gate slide plate from the first closed position to the second open position.

18. The method of claim 17, wherein the magnetic mounting rails are magnetic and the conveyor trough is not magnetic.

19. The method of claim 17, wherein the actuating system comprises a linear actuator having a distal end attached to the gate slide plate.

20. The method of claim 17, wherein the gate slide plate is attached to both the conveyor trough and the actuating system only through magnetic force.

* * * * *